3,040,296
DETECTION OF TRANSPOSITIONS IN DIGITAL NUMBERS

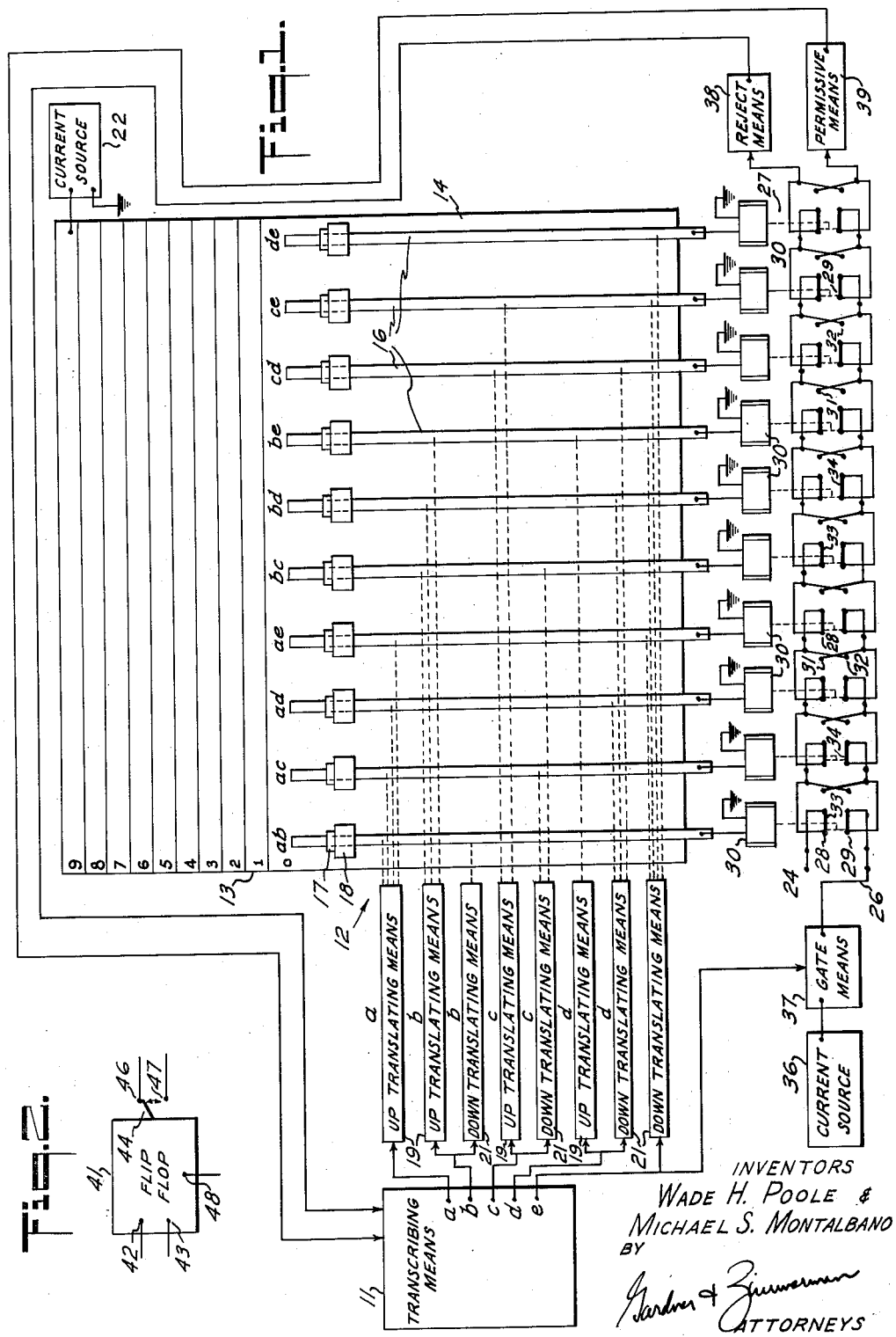

Wade H. Poole, 159 Alvarado Road, Berkeley 5, Calif., and Michael S. Montalbano, Lafayette, Calif. (611 Arastradero Road, Palo Alto, Calif.)
Filed May 26, 1959, Ser. No. 815,903
7 Claims. (Cl. 340—147)

The present invention relates to the detection of errors in coded numbers, and more particularly, to the elimination of invalid coded numbers arising from transpositions of adjacent digits of a valid number as employed in devices operating upon a coded number system.

Many present day devices utilize numerical, alphabetic, or other digital coding systems as the basis of their operation. Machine accounting equipment, for example, is designed to operate in accordance with coded systems of account numbers, credit card numbers, stock numbers, and the like, with the coded number information being usually fed into the equipment by a mechanical transcription device such as card or tape punches, keyboard linkages, or equivalent means. Similarly, telephone numbering systems determine the operation of central line-finding equipment such that when a coded telephone number is dialed, the corresponding telephone is automatically selected in response to the digits of the telephone number.

Any of the foregoing as well as other equipments operating in accordance with digital coding systems are susceptible to error due to mechanical failure, human mistakes in transcribing the coded numbers into the equipment, and the like. One error which frequently occurs arises from the inadvertent transposition of adjacent digits of a coded number during its transcription into the equipment. Transposition is herein defined as the interchanging of two digits which only occur side by side in a given number. For example, in dialing a telephone number including the digits 1234, a transposition of the digits 2 and 3 may often be inadvertently made such that the actual number dialed is 1324 resulting in a wrong number.

The present invention provides a method and means for detecting such inadvertent transpositions of adjacent digits of a coded number whereby errors in the operation of the utilizing equipment arising therefrom may be prevented. Equipment utilizing the present invention may accordingly be made positively safe from transposition errors.

It is therefore an object of the present invention to provide method and means for adapting various equipment to detect commonly occurring transposition errors in the use of a numerical code.

Another object of this invention is the provision of method and means whereby several sets of mutually transposition-proof numbers may be used jointly in devices operating according to numerical, alphabetic, or other digital coding systems.

Yet another object of the invention is to count the number of inversions occurring in the successive digits of a number in predetermined order and from a determination of the oddness or evenness of the inversions detect the existence of an inadvertent transposition of digits.

A further object of this invention is to provide for the arrangement of numbers in a coding system into respective odd and even inversion subsets and method and means with which the subsets may be employed to prevent undetected transpositions between the digits of numbers in either of the subsets.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:
FIGURE 1 is a schematic diagram of transposition preventing apparatus in accordance with the present invention, and
FIGURE 2 is a schematic diagram of alternative inversion counting and evenness determining means for employment in the apparatus of FIGURE 1.

Considering now the invention in some detail, it is to be first noted that we have found that by preselecting the numbers employed in a digital coding system to all have either an even number of inversions or to all have an odd number of inversions, certain steps may be performed with the numbers by a variety of means to detect transposition errors therein. More particularly, all digital numbers can be divided into transposition proof classes having respectively even and odd numbers of inversions and upon the transposition of digits in a number of one class, a number of the other class results such that if one class is considered to be valid and the other invalid, a transposition in a valid number results in an invalid number. Inversion is herein defined as occurring whenever any digit in a predetermined sequence of digits (e.g., from left to right) having a prescribed relative rank (e.g., numerical, lexicographical or other) and comprising a number is followed by a smaller digit at any point later in the sequence. As examples of the foregoing it will be noted that 1243 has one inversion, 4 before 3; 1423 has two inversions, 4 before 2 and 4 before 3; 1432 has three inversions, 4 before 3, 4 before 2, and 3 before 2; 4321 has six inversions, 4 before 3, 4 before 2, 4 before 1, 3 before 2, 3 before 1, and 2 before 1; etc. In accordance with the basic concepts of the invention, the numbers 1243 and 1432 fall into one class of numbers having an odd number of inversions while the numbers 1423 and 4321 fall into another class of numbers which have even numbers of inversions. Transposing the digits 2 and 4 of 1243 produces the number 1423 of the other or even class. Similarly, transposing the digits 3 and 2 of the number 1423 produces the number 1432 of the odd class.

The present invention utilizes the above concept to great advantage in the detection and elimination of errors as frequently arise from inadvertent transpositions of adjacent digits of coded numbers during their transcription into a variety of equipments operating in accordance with numerical coding systems. In accordance with the method of the present invention, a valid set of numbers for employment in the particular coding system, e.g., telephone numbers, account numbers, stock numbers, and the like, are preselected from the class of numbers having an even number of inversions or from the class of numbers wherein the number of inversions is odd, the unselected class being thus designated as invalid numbers. During transcription of the preselected valid numbers or other operations therewith in the utilizing equipment, the number of inversions of the digits in a predetermined order (e.g., left to right) of the number are counted and the evenness or oddness of the number of inversions determined. The foregoing may be accomplished as separate steps or simultaneous steps depending upon the particular means employed to conduct same.

Having determined the evenness or oddness of the inversions in the number, the validity of the number is hence determined by comparison with the evenness or oddness of inversions of the preselected set of valid numbers. If the sense is similar the transcribed number is valid, whereas if the sense is dissimilar the number is invalid and a transposition of digits has occurred. For example, where the preselected set of valid numbers have even numbers of inversions, the observation of a transcribed number having an odd number of inversions detects a transposition error. The numbers having numbers of inversions with a sense commensurate with that of the preselected set of valid numbers as determined hereinbefore may hence be accepted and transmitted into the equipment for further operations. Those numbers having a sense of numbers of inversions dissimilar to that of the valid set of numbers may be rejected as invalid and an indication of the invalidity provided the operator of the machine. The foregoing concept can be used in a variety of ways to permit an operation to proceed and to certify it in response to a valid number while halting an operation and identifying it as incorrect in response to an invalid number. For example, in a mechanical transcription device such as a card or tape punch, a valid number signal could insert a "valid code" punch, an invalid number signal could insert a "bad code" punch. Used as a certification of the accuracy of telephone dialing, a "valid" signal could release a properly dialed phone number to central line-finding equipment; an "invalid" signal could energize an "invalid number" hum.

Considering now various means for conducting the steps of the method of the present invention hereinbefore described, it will be appreciated that the individual steps can be conducted by a wide variety of equipment apparent to those skilled in the art. The method may be conducted, for example, by the means depicted schematically in FIGURE 1 of the drawings. As shown therein, apparatus in accordance with the present invention is provided for preventing errors in equipment arising from inadvertent transpositions of adjacent digits in numbers transcribed thereinto as by means of transcribing means 11 such as a card or tape punch, telephone dialing apparatus, or the like. Where the equipment is arranged to operate in accordance with five digit numbers as herein described and illustrated in the drawings solely for illustrative purposes, the transcribing means is provided with five outputs labeled $a$, $b$, $c$, $d$, $e$, respectively, and corresponding to the digits of a transcribed number in left to right sequence. The outputs may be mechanical or electrical and are each proportional to the rank or numerical value of the corresponding digit of a transcribed number. For example, where the numbers are comprised of numerical digits, a quantity of electrical pulses might be produced at each output corresponding to the numerical value of the particular digit. Hence, the number 12345 would produce one pulse at output $a$, two pulses at output $b$, three pulses at output $c$, four pulses at output $d$, and five pulses at output $e$.

In order to count the number of inversions in a number transcribed by transcribing means 11 in accordance with the present invention, inversion counting means 12 is responsively coupled to the outputs $a$, $b$, $c$, $d$, $e$. Inversion counting means 12 may, for example, comprise a metallic conducting plate 13 divided into a plurality of horizontal zones corresponding to the rank value of digits in order of increasing significance from bottom to top of the plate. The zones may be respectively designated as the numerals 1–9 inclusive from bottom to top. Beneath the lower edge of plate 13 there is provided an insulating member 14 upon which are mounted a plurality of vertically slidable electrically conducting rods 16 respectively corresponding to the various pairs of digits of a number between which an inversion may exit. The rods are respectively labeled in the figure in the interest of clarity as $ab$, $ac$, $ad$, $ae$, $bc$, $bd$, $be$, $cd$, $ce$, $de$ to designate their function as to the various pairs of digits between which inversions are to be determined. The rod, $ab$, is used to determine whether an inversion exists between the $a$ and $b$ digits of a digital number; and similarly for the other labeled rods. All rods 16 have a rest position wherein the upper end of the rods are disposed below the lower edge of plate 13 and which corresponds numerically to zero. Such rest position is determined, for example, by a stop collar 17 rigidly secured to each rod and engaging the face of the slide bearing 18 mounting the rod to determine the zero rest position at the bottom extreme of downward translation of the rod. Upon upward translation of the rods, the upper ends thereof make electrical contact with the face of plate 13 in various of the zones thereof depending upon the vertical distance through which the rods are moved.

The movement of the rods 16 of inversion counting means 12 is facilitated by a plurality of up translating means 19 and down translating means 21 which are appropriately operatively coupled to the rods as hereinafter described and which operate in response to the outputs $a$, $b$, $c$, $d$, $e$ of transcribing means 11. The translating means 19, 21 may be provided as servomotors geared to the rods to translate same through an integral length in response to each pulse appearing at the corresponding one of the outputs of transcribing means 11. Alternatively, the translating means may be a suitable mechanical linkage connected to the digital input mechanism of the transcribing means or the like. In any case, the up translating means 19 move the bars 16 connected thereto a distance in the up direction equal to the magnitude of the digit at one of the outputs of transcribing means 11 as represented by one of the horizontal zones of plate 13. A digit having a numerical value of 2 at the transcribing means causes an up translating means 19 to move the rods coupled thereto from the zero rest positions to positions wherein the upper ends of the rods coincide with the center of the "2" zone of the plate 13. Similarly, the down translating means 21 move the rods equal lengths in the down direction dependent upon the magnitudes of the digits at the outputs of the transcribing means. One of the up translating means 19 labeled as "$a$" in the figure is responsively coupled to output $a$ of transcribing means 11 and operatively coupled to the rods 16 respectively designated as $ab$, $ac$, $ad$, $ae$. A second up translating means 19 labeled as "$b$" is provided between output $b$ of the transcribing means and the $bc$, $bd$, $be$ ones of rods 16, while one of the down translating means 21 designated as $b$ is responsively coupled to output $b$ and operatively completed to the rod 16 designated as $ab$. Another up translating means designated as "$c$" is similarly provided to drive rods $cd$, $ce$ in response to output $c$ and one of the down translating means designated as $c$ is coupled between output $c$ and rods $ac$, $bc$. To drive the rod $de$ in the up direction, still another of the up translating means, designated $d$, is coupled between output $d$ and the rod. The down translating means labeled $d$ is also coupled to output $d$ but is operatively coupled to the ones of rods 16 designated as $ad$, $bd$, $cd$. Finally, one of the down translating means 21, designated $e$, is responsively coupled to output $e$ and operatively coupled to the rods labeled $ae$, $be$, $ce$, $de$. With the coupling arrangement just described the rods 16 are thus moved up a number of zones of plate 13 corresponding to the numerical value of the first digit of the rod label in response to the appearance of such value at the corresponding output of transcribing means 11. The rods are similarly moved down a number of zones corresponding to the numerical value of the second digit of the rod labels when a value for such digit appears at the corresponding transcribing means output except that the rods never move down further than the zero position by virtue of stop collars 17. As an example of the movement of the rods, consider the specific number 57482 appearing at outputs $a$, $b$, $c$, $d$, $e$ of transcribing means 11, i.e., $a=5$, $b=7$, $c=4$, $d=8$, $e=2$. The digit 5 causes up translating means $a$ to move rods $ab$, $ac$, $ad$, $ae$, respectively up five increments to the 5 zone. In response to the second digit 7, up translating means $b$ moves each of rods $bc$, $bd$, $be$ up seven increments to the 7 zone. In addition, the digit 7 causes down translating means $b$ to attempt to move rod $ab$ down seven increments, however the rod is moved down only five increments since this returns it to zero position. The digit 4 similarly effects upward movement of rods *cd, ce* to the 4 zone and movement of rods *ac, bc* downward four increments to respectively the 1 zone and the 3 zone. In a like manner, responsive to the digit 8, rod *de* is moved up eight increments from the zero position to the 8 zone of plate 13. Simultaneously, rods *ad, bd, cd* respectively tend to be moved down eight increments but can be moved no further than their zero positions. The digit 2 causes down translating means *e* to move rods *ae, be, ce, de* down two steps whereby such rods respectively contact plate 13 in the 3, 5, 2, 6 zones. The rods *ac, bc, ae, be, ce, de* hence contact plate 13 whereas the remainder of the rods are in the zero position. Since the rods are moved up by amounts equal to the numerical value of the first digit of their label and down by amounts equal to the numerical value of their second digit, the rods contacting plate 13 are due to the first digit being greater than the second digit of their label, i.e., contact with the plate indicates an inversion. Thus, for the number 57482, there are six inversions, rod *ac* depicting 5 greater than 4, rod *bc* 7 greater than 4, rod *ae* 5 greater than 2, rod *be* 7 greater than 2, rod *ce* 4 greater than 2 and rod *de* 8 greater than 2. To convert the number of inversions as indicated by the number of rods 16 in contact with plate 13 to usable electrical signals, it is only necessary to connect a current source 22 to plate 13 whereby current flows through the contacting rods to responsive circuits which may be connected thereto.

As regards the determination of the evenness or oddness of the number of inversions counted by the inversion counting means 12, suitable sense determining means 23 are coupled to rods 16 in receiving relation to the electrical inversion indicating signals flowing therethrough. Such sense determining means 23 may for example comprise a pair of parallel conducting lines 24, 26 each continuous except for a plurality of switching points corresponding to the respective rods 16 and which are similarly labeled in the figure The line 24 may be designated as the "odd" line and the line 26 designated as the "even" line for example. At each of the switching points there is provided a suitable switching device which connects the left hand set of terminals with the right hand set of terminals of the lines 24, 26. Such switching devices are each arranged such that when in its normal position, the left hand odd and even terminals at the corresponding switching point are respectively connected to the right hand odd and even terminals. Conversely, when a switching device is energized in response, for example, to an inversion signal in a rod 16, the left hand odd and even terminals are respectively conneceted to the right hand even and odd terminals, i.e., the connection is transposed. Double pole-double throw relays 27 may hence be employed as the switching devices at each switching point with the operating solenoids 30 thereof series connected between the corresponding ones of rods 16 and ground. Each relay 27 is provided with a pair of normally closed contacts 28, 29 respectively directly connected to the right hand odd and even terminals of lines 24, 26 and a pair of normally open contacts 31, 32 connected in transposed relation to the right hand odd and even terminals at each switching position. The armatures 33, 34 of each relay are directly connected to the left hand odd and even terminals of the lines 24, 26 at the switching points thereof. Thus, with no current flowing through a rod 16, the solenoid 28 of the corresponding relay 27 is unenergized and armatures 33, 34 contact normally closed contacts 28, 29 to thereby connect the left hand terminal to the right hand terminal of odd line 24 and the left hand terminal to the right hand terminal of even line 26 at the corresponding switching point. With current flowing through the rod indicating an inversion, the solenoid of the relay is energized thus causing armatures 33, 34 to contact normally open contacts 31, 32 and thereby connect the left hand terminal of odd line 24 to the right hand terminal of even line 26 and the left hand terminal of even line 26 to the right hand terminal of odd line 24. A current applied to the even line 26, for example, thus flows through the even line when the switching relays 27 are unenergized, but is switched to the odd line 24 and vice versa each time the relay at one of the switching points is energized in response to an inversion signal. Moreover, it will be noted that if the number of relays 27 energized in response to inversion signals in rods 16 is even, a complete circuit for the current is provided through lines 24, 26 to the rightmost terminal of even line 26. If the number of energized relays is odd, the complete circuit is made to the rightmost terminal of odd line 24. With the example of previous consideration for the number 574,82, inversion signal current is applied via rods *ac, ae, bc, be, ce, de* to the relays 27 at the corresponding switching points of lines 24, 26, while the relays corresponding to rods *ab, ad, bd, cd* are unenergized. Hence current applied to the leftmost terminal of even line 26 flows to the even line through switching point *ab,* is switched to the odd line through point *ac,* flows to the odd line through point *ad,* is switched to the even line at point *ae,* is switched to the odd line at point *bc,* flows to the odd line through point *bd,* is switched to the even line at point *be,* flows to the even line through point *cd,* is switched to the odd line at point *ce,* and is switched back to the even line at point *de* to emerge from the rightmost terminal of even line 26. This indicates an even number of inversions which is correct since the number 57482 has six inversions.

To supply the indicating current to sense determining means 23, a current source 36 is preferably connected to the leftmost terminal of even line 26 through gate means 37 responsively coupled to the last digit output *e* of transcribing means 11 to insure prior positioning of rods 16 of inversion counting means 12 in response to the transcription of a number by the transcribing means. Indicating current is thus applied to the even line 26 of sense determining means 23 only after the inversions of a transcribed number are counted. Suitable reject means 38 and permissive means 39 may then be responsively connected to the rightmost terminals of odd and even lines 24 and 26 respectively. The reject and permissive means 38, 39 are in turn operatively coupled to the transcribing means 11 to reject invalid numbers (preselected as having an odd number of inversions) as by blocking the transmitting mechanism of the transcribing means, and pass valid numbers (preselected as having an even number of inversions) as by rendering the transmitting mechanism passive. Alternatively, numbers having an odd number of inversions may be preselected as the valid ones in which case the output of gate means 37 is connected to odd line 24 and the connections from lines 24, 26 to reject means 38 and permissive means 39 are reversed. Selector switches (not shown) may hence be advantageously provided between the gate means 37 and lines 24, 26 and such lines and the reject means 38 and permissive means 39 to facilitate ready adaption of the circuit to use with either odd or even inversion numbers as the valid ones.

The means in accordance with the present invention hereinbefore described and illustrated in FIGURE 1 of the drawing operates to prevent numbers having an inadvertent transposition of adjacent digits from being transmitted from the transcribing means 11 into the utilizing equipment. Where numbers having an even number of inversions are preselected as the valid number set, the correct transcription of the number by the transcribing means results in the application of a signal from even line 26 to permissive means 38 which in turn renders the transmitting mechanism of the transcribing means 11 to the equipment passive to the transcribed number. Upon the transposition of adjacent digits in the number during transcription, however, an odd number of inversions is counted by the counting means 12 and the sense determining means 23 is responsively actuated such that an indicator signal is applied from odd line 24 to reject means 38. The reject means then functions to block transmission of the invalid number to the utilizing equipment and to indicate the error to the operator of transscribing means 11.

It will be appreciated that many alternative means may be utilized to conduct the method steps of the present invention, and in this connection a suitably interconnected diode switching matrix could be, for example, employed as the inversion counting means 12. The sense determining means 23 might also be alternatively provided as shown in FIGURE 2 of the drawings. As illustrated therein, a flip-flop 41 may be utilized to simultaneously count inversions and determine evenness. More specifically, flip-flop 41 includes a pair of terminals 42, 43 to which pulses are applied to alternate an armature 44 between output terminals 46, 47 in response to each pulse. A current input terminal 48 is additionally provided and is interconnected within the flip-flop to armature 44. One output terminal 46 may be designated as the rest position for armature 44 and considered to indicate even. Pulses successively applied to terminals 42, 43 responsively alternate the armature between the even terminal 46 and the odd terminal 47. If the number of pulses applied to terminals 42, 43 is odd, the armature is shifted an odd number of times and assumes a final position contacting the odd terminal 47. Conversely, an even number of pulses causes the armature 44 to alternate an even number of times and assume a final position contacting even contact terminal 46. The flip-flop 41 may consequently be provided as an Eccles-Jordan bistable trigger pair, the input to one of the tubes of which is connected to terminals 42, 43 and the plate circuits of the respective tubes of which are series connected with the solenoids of a differential relay operating in mutual opposition. The armature 44 is in this case the armature of the differential relay and the output terminals 46, 47 are the contacts thereof while terminal 48 is connected directly to the armature.

To employ the flip-flop 41 with the inversion counting means 12, the inversion signals from the rods 16 must be applied to the flip-flop as successive pulses as mentioned hereinbefore. To facilitate the foregoing, the inversion counting current source 22 is provided as a pulsed source and a plurality of delay lines of graded lengths may be employed to connect the rods 16 in parallel to terminals 42, 43 of flip-flop 41. A pulse appearing simultaneously at successive ones of the rods 16 is delayed by successively greater time increments in passage through the graded delay lines whereby the pulses appear in succession at the input of the flip-flop. To complete the circuit, the terminal 48 of the flip-flop would be connected to gate means 37 and output terminals 46, 47 respectively to permissive means 39 and reject means 38. The flip-flop 41 thus responsively actuates the permissive means 39 and reject means 38 in response to inversion sense signals at the even and odd output terminals 46, 47 respectively.

What is claimed is:

1. Apparatus for detecting transposition errors in the coded numbers of a coding system in which the valid numbers have a number of inversions of preselected odd or even sense comprising means responsive to coded numbers for counting the numbers of inversions between the digits thereof, and means responsive to the number of counted inversions for detecting the sense thereof, whereby a detected sense of the number of counted inversions dissimilar to the preselected sense of said valid numbers is indicative of a transposition error.

2. In apparatus for preventing transposition errors in the transcribing of coded numbers of a coded number system in which the valid numbers are preselected to have either an odd or an even sense of numbers of inversions in a predetermined order, the combination comprising transcribing means responsive to coded numbers, inversion counting means responsively coupled to said transcribing means for counting the number of inversions between the digits of a number transcribed thereby, sense determining means responsively coupled to said inversion counting means for detecting the sense of the number of inversions counted for each number and generating signals indicative of the detected sense of the number of inversions, permissive means coupled to said sense determining means for permitting the transmission of numbers from said transcribing means in response to signals indicative of the same sense as the preselected sense of the number of inversions of said valid numbers, and reject means coupled to said sense determining means for blocking the transmission of numbers from said transcribing means in response to signals indicative of the opposite sense of the number of inversions as that of said valid numbers.

3. In apparatus for preventing transposition errors in the transcribing of coded numbers of a coded number system in which the valid numbers have numbers of inversions between the successive digits thereof of preselected odd or even sense, the combination comprising transcribing means responsive to coded numbers and having outputs corresponding to the successive digits thereof for producing signals thereat proportional to the values of the corresponding digits of a transcribed number, inversion counting means responsively connected to the outputs of said transcribing means for comparing said value of the respective digits with each successive digit of the transcribed number and producing an inversion indicating signal in response to each occurrence of a value of digit being greater than that of a succeeding digit to which compared, sense detecting means connected to said inversion counting means in receiving relation to the inversion indicating signals therefrom for detecting the sense of the number of inversions indicating signals and responsively generating signals indicative of the detected sense of the number of inversion signals, permissive means coupled to said sense detecting means in receiving relation to the signals therefrom indicative of the same sense as that of the numbers of inversions of said valid numbers and coupled to said transcribing means to responsively render same passive to the number transcribed thereby, and reject means coupled to said sense detecting means in receiving relation to the signals therefrom indicative of the opposite sense of the number of inversion signals from that of said valid numbers and coupled to said transcribing means to responsively render same impassive to the number transcribed thereby.

4. In apparatus as defined by claim 6, the combination further defined by said inversion counting means comprising an electrically conducting plate, a plurality of electrically conducting rods mounted for vertical contacting translation with respect to said plate and having rest positions insulated therefrom, said rods respectively corresponding to different pairs of the digits of a number between which inversions can occur, translating means responsively coupled to the outputs of said transcribing means and operatively coupled to said rods to translate same upwardly by amounts proportional to the value of the lower order digit corresponding thereto and downwardly by amounts proportional to the value of the succeeding higher order digit corresponding thereto, and a current source connected to said plate.

5. In apparatus as defined by claim 6, the combination further defined by said sense detecting means comprising a pair of parallel conducting lines having a plurality of switching points each corresponding to a different pair of digits compared relative to value by said inversion counting means, one of said lines being designated as even and the other being designated as odd, a plurality of switching means disposed at said switching points and connected to said inversion counting means in receiving relation to said inversion indicating signals therefrom for connecting the left hand terminals of the odd and even lines to the right hand terminals of the odd and even lines at the respective switching points in the absence of inversion indicating signals while connecting the left hand terminal of the odd line to the right hand terminal of the even line and the left hand terminal of the even line to the right hand terminal of the odd line at the respective switching points in the presence of inversion indicating signals, current supply means coupled to the one of said pair of lines having the same sense as that of the numbers of inversions of said valid numbers, and means connecting said line of the same sense as that of the numbers of inversions of said valid numbers to said permissive means and connecting the line of opposite sense to said reject means.

6. In apparatus as defined by claim 6, the combination further defined by said sense detecting means comprising a flip-flop having input terminals for connection to said inversion counting means and successive reception of inversion indicating signals therefrom, an armature alternating between odd and even output terminals in response to each successive inversion indicating signal, and a current input terminal connected to the armature; a current source connected to the current input terminal of said flip-flop; and means connecting the flip-flop output terminal having the same sense as the numbers of inversions of said valid numbers to said permissive means and connecting the flip-flop output terminal of opposite sense to said reject means.

7. In apparatus for preventing transposition error in the transcribing of coded numbers of a coded number system in which the valid numbers have numbers of inversions between the successive digits thereof of preselected odd or even sense, the combination comprising transcribing means responsive to coded numbers and having outputs corresponding to the successive digits thereof for producing signals thereat proportional to the values of the corresponding digits of a transcribed number, an electrically conducting plate, a plurality of electrically conducting rods mounted for vertical contacting translation relative to said plate and having rest positions insulated therefrom, said rods respectively corresponding to pairs of digits of the coded numbers between which inversions can occur, translating means responsively coupled to the outputs of said transcribing means and operatively coupled to said rods to translate same upwardly by amounts proportional to the value of the lower sequential order digit and downwardly by amounts proportional to the value of the higher sequential order digit of the pairs of digits corresponding to said rods, a current source connected to said plate, a pair of parallel electrically conducting odd and even lines having a plurality of switching points respectively corresponding to said rods, a plurality of switching means disposed at said switching points and respectively connected to said rods in receiving relation to current flowing therethrough, said switching devices connecting the left hand terminals of the odd and even lines to the right hand terminals of the odd and even lines at the respective switching points in the absence of current and connecting the left hand terminal of the odd line to the right hand terminal of the even line and left hand terminal of the even line to the right hand terminal of the odd line at the respective switching points in the presence of current flow through the corresponding rods, a second current source coupled to the one of said pair of lines having the same sense as that of the numbers of inversions of said valid numbers, permissive means responsively coupled to the line having the same sense as that of the numbers of inversions of said valid numbers and coupled to said transcribing means to render same passive to the number transcribed thereby upon the flow of current from said line, and reject means responsively coupled to the other of said lines and coupled to said transcribing means to render same impassive to the number transcribed thereby upon the flow of current from said line.

References Cited in the file of this patent

UNITED STATES PATENTS 2,552,629  Hamming et al. _____ May 15, 1951